US006225634B1

United States Patent
Atrashkevich et al.

(10) Patent No.: US 6,225,634 B1
(45) Date of Patent: May 1, 2001

(54) TRUE COINCIDENCE SUMMING CORRECTION FOR RADIATION DETECTORS

(75) Inventors: Valerii V. Atrashkevich; Vladimir P. Kolotov, both of Moscow (RU)

(73) Assignee: Canberra Industries, Inc., Meriden, CT (US)

(*) Notice: Subject to any disclaimer, the term of this patent is extended or adjusted under 35 U.S.C. 154(b) by 0 days.

(21) Appl. No.: 09/106,617

(22) Filed: Jun. 29, 1998

Related U.S. Application Data

(63) Continuation of application No. PCT/US96/20730, filed on Dec. 20, 1996.
(60) Provisional application No. 60/009,336, filed on Dec. 28, 1995.

(51) Int. Cl.[7] .................................................. G01T 1/178

(52) U.S. Cl. .......................................... 250/393; 250/369

(58) Field of Search ..................................... 250/393, 369

(56) References Cited

U.S. PATENT DOCUMENTS 5,083,026 * 1/1992 Elbaum .................................. 250/369

* cited by examiner

Primary Examiner—Constantine Hannaher
Assistant Examiner—Andrew Israel
(74) Attorney, Agent, or Firm—John H. Crozier

(57) ABSTRACT

A method of determining coincidence correction for a radiation detector in the presence of a radiation source symmetrical around the axis of the radiation detector, including: calculating the coincidence correction per the equation $$COI_g = \frac{\varepsilon_g}{\int\int\int \frac{\varepsilon_{(g)x,y,z}}{COI_{(g)x,y,z}} dx\,dy\,dz}$$

where $\varepsilon_g$ is full peak efficiency for the radiation source, where $\varepsilon_{(g)\,x,y,z}$ are values of full peak efficiency inside said radiation source obtained from efficiency mapping in the space around said detector, and where the values of $COI_{(g)\,x,y,z}$ for points under integration inside the radiation source are a function of full peak efficiency, decay chain data, and peak-to-total ratio.

1 Claim, 1 Drawing Sheet

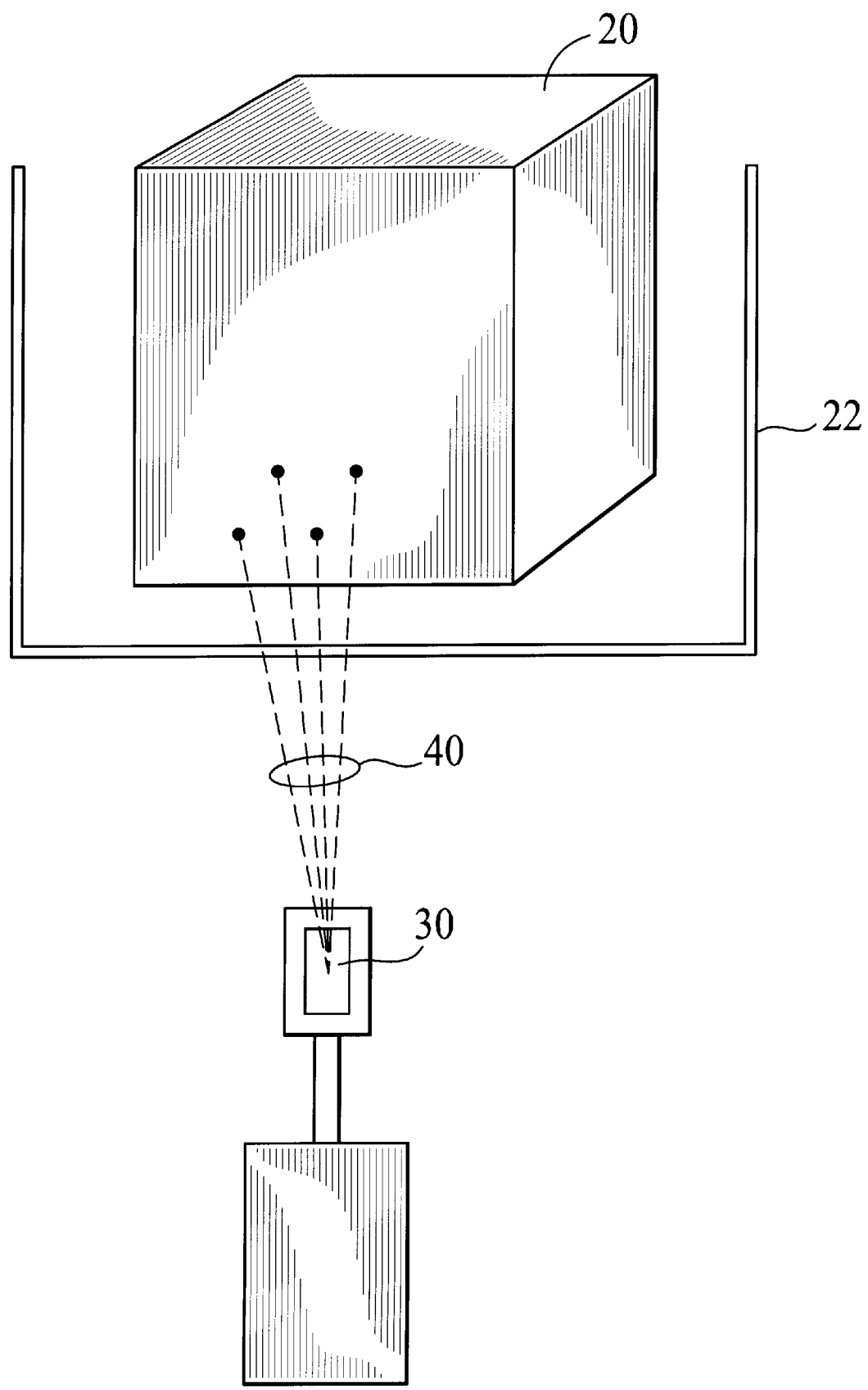

TRUE COINCIDENCE SUMMING CORRECTION FOR RADIATION DETECTORS

CROSS-REFERENCE TO RELATED APPLICATIONS

The present application claims the benefit of the filing dates of United States Provisional Application Serial No. 60/009,336, filed Dec. 28, 1995, and a continuation of International Patent Application Serial No. PCT/US96/20730, filed Dec. 20, 1996.

TECHNICAL FIELD

The present invention relates to gamma spectrometry generally and, more particularly, but not by way of limitation, to a novel method for characterizing radiation detectors to provide efficiency calibration and true coincidence summing correction.

BACKGROUND ART

Gamma spectrometry is commonly used to detect the presence of radio activity in environmental samples. With the large amount of decontamination and decommissioning work expected to be performed in the US as well as overseas, the number of such measurements is likely to increase significantly in the near future. The current gamma spectrometry practices have two shortcomings. The normal practice of calibration requires a calibration standard carefully manufactured to be identical to each sample size and shape, or as nearly so as possible. With many different sizes, shapes, and chemical compositions of samples, such a calibration can be both time consuming and expensive. The second problem is that, due to the low activities involved, it is customary to bring the sample as close to the detector as possible to increase the sensitivity of analysis and/or to reduce the measurement times. This gives rise to often significant amount of coincidence summing (also called cascade summing). Current commercial software codes, and nearly all research codes, are not able to correct for this effect in the reported results, even though the required correction factors are often more than 10% and sometimes as high as 50%.

With voluminous sources, such as the samples commonly used with close measurement geometries, the parts of the sample that are close to the detector exhibit more cascade summing effects than the parts that are further away from the detector. For such cases, the overall correction is a combination of rather large correction factors and rather small correction factors.

The majority of radionuclides decay by emitting multiple gamma- and X-ray photons in cascades with negligible time delay (at least in less time than the resolution time of detector systems). In the detector crystal, this causes energy depositions which are impossible to attribute to the proper emission energy (nuclear level transition) and the detector system is thus able to register only a summing effect. This true coincidence effect causes summing in or summing out. Summing in leads to an increase of an observable peak area, whereas summing out leads to a decrease of an observable peak area. The total effect with respect to a gamma-line 'g' of a radionuclide under consideration is:

$$CO1_g = (1-Lg)(1+Sg)$$

where Lg is the probability of summing out and Sg is the probability of summing in. The corrected peak area ($N'_{p,g}$) is computed from the observable peak area ($N_{p,g}$) using the equation:

$$N'_{p,g} = \frac{N_{p,g}}{COI_g}$$

The general quantitative procedure for treatment of true coincidence effect in the case of complex decay schemes has been considered by Andreev et al. (1. D. S. Andreev, et al. *Instr. Expt. Techn.*, 15 (1972) p.1358 and D. S. Andreev, et al., Izv. Akad. Nauk SSSR, Ser. Fiz., 37 (1973), N.8, p.1609). Verplancke (J. C. Verplancke, *Nucl. Instr. Meth. Phys. Res.*, 96 (1971), p.557.) proposed a formula for estimation of efficiency in the case of coincidence summing for $^{60}$Co and $^{88}$Y, and has considered positron-gamma cascades. McCallum and Coote (G. J. McCallum and G. E. Coote, *Nucl. Instr. Meth. Phys. Res.*, 130 (1975), p.189.) considered the case of gamma-beta+ coincidence summing out and demonstrated the workability of their approach for 22Na. Gehrke et al. (R. J. Gehrke, et al., *Nucl. Instr. Meth. Phys. Res.*, 147 (1977), p.405.) tabulated the coincidence summing corrections for some radionuclides measured with a Ge(Li) detector at 10-cm distance. Debertin and Schötzig (K. Debertin and U. Schötzig, *Nucl. Instr. Meth. Phys. Res.*, 158 (1979) p.471.) experimentally checked Andreev's solution for $^{60}$Co, $^{88}$Y, and $^{152}$Eu for point and beaker geometries close to the detector. Moens (L. Moens, Doctorate Thesis, Rijksuniversiteit, Gent (1981) and L.Moens, et al., *J. Radioanal. Chem.* 70 (1982), p. 539.) generalized the method, suggested the use of gamma intensities instead of beta intensities, and derived mathematical formulae for practically important cases. De Corte (F. De Corte, Doctorate-Thesis, Rijksuniversiteit, Gent (1987)) updated the approach by Moens, and extended it for the cases of gamma-KX(EC) and gamma-KX(IT) coincidences. Jovanovich et al. (S. Jovanovic, et al., *Vest. Slov. Kem. Drus.*, 35 (1988), N.4, p.409) discussed some practical aspects of true coincidence correction in the case of neutron activation analysis using the $K_0$-method. Dobreva et al.(E. Dobreva, et al., *Bulg. J. Phys.*, 16 (1989), N.2, p.194) investigated the application of attenuators made from different materials to reduce the contribution of true-coincidence effect. Lin Xilei and Heydorn (Lin Xilei and K. Heydorn, *J. Radioanal. Nucl. Chem., Articles*, 169, N.2 (1993), p.419) demonstrated that application of absorbers may reduce the contribution of KX-gamma coincidences in the case of measurements with N-type detectors. De Corte and Freitas (F. De Corte and C. Freitas, *J. Radioanal. Nucl. Chem., Articles*, 160 (1992), p.253 and C. Freitas, et al., *Biological Trace Element Research* (1990), p.33) extended the method for computation of true-coincidence corrections for the case of gamma-KX coincidence. Blaauw (M. Blaauw, *Nucl. Instrum. Meth. Phys. Res.*, A332 (1993), p.493) suggested to use artificial summing peaks for simultaneous computation of the true coincidence effect and activity in the case of point source. De Corte, et. al. (F. De Corte, et al., *Nucl. Instrum. Meth. Phys. Res.*, A353 (1994), p.539) developed a method for estimation of true coincidence effect for the case of auger hole counting geometry ("infinite" Marinelli beaker).

This analysis of the literature shows that the problem of coincidence correction for point sources is practically resolved. However, this does not mean that the problem has been resolved for a more general case such as voluminous sources, especially those that are symmetric around the axis of the detector.

Accordingly, it is a principal object of the present invention to provide a method for characterizing radiation detectors that does not require manufacturing calibration standards nearly identical to sample sizes, shapes, chemical compositions, and/or radionuclides content.

It is a further object of the invention to provide a method for correcting for coincidence summing.

It is another object of the invention to provide such method to calibrate and correct for the coincidence summing effects in both small and voluminous radioactive samples.

It is an additional object of the invention to provide such method that is easily implemented and is accurate.

It is yet a further object of the invention to provide such method that is applicable for samples of various geometrical shapes, physical states, and chemical compositions.

It is yet another object of the invention to provide such method that is suitable for routine laboratory radioassay.

It is yet and additional object of the invention to provide such method for correcting for coincidence summing in gamma spectrometry for any radiation source that is symmetric around the axis of the detector.

Other objects of the present invention, as well as particular features, elements, and advantages thereof, will be elucidated in, or be apparent from, the following description.

DISCLOSURE OF INVENTION

The present invention achieves the above objects, among others, by providing, in a preferred embodiment, a method of determining coincidence correction for a radiation detector in the presence of a radiation source symmetrical around the axis of said radiation detector, comprising: calculating said coincidence correction per the equation $$COI_g = \frac{\varepsilon_g}{\iiint \frac{\varepsilon_{(g)x,y,z}}{COI_{(g)x,y,z}} dxdydz}$$

BRIEF DESCRIPTION OF THE DRAWING

Understanding of the present invention will be facilitated by reference to the drawing FIGURE, submitted for purposes of illustration only and not intended to be a limitation on the disclosure of the invention, on which:

The single drawing FIGURE illustrates an apparatus for carrying out the present invention.

BEST MODE FOR CARRYING OUT THE INVENTION

Referring to the single drawing FIGURE, there is illustrated apparatus that may be employed in carrying out the present invention. Here, a gamma radiation source 20 volume 20 is disposed in a sample container 22. A radiation detector 30 is disposed in sensing proximity to sample container 22. Radiation from source volume 20 is thus detected by radiation detector 30 and photons 40 from source volume 20 may be detected simultaneously by radiation detector 30, causing the problem to which the method of the present invention is directed.

While radiation source 20 is shown as being a rectangular parallelpipedon, the radiation source may be of any of various geometrical shapes.

The computation of the coincidence correction for a voluminous source is a significantly different task than the computation of the coincidence correction for a point source. It is obvious that for a voluminous source, it is impossible to use the efficiency computed for the whole sample as the input for calculation of the correction.

Let us consider the voluminous sample as consisting of a set of subsamples having similar volumes (for a cylindrical source, each subsample may represent a thin layer parallel to the bottom of the source). Knowing the peak area of a response trace corresponding to each subsample and assuming that peak efficiency and P/T-ratio for a subsample are constant values, it is possible to compute coincidence correction for each subsample and obtain the correction factor for the whole sample. This leads to the following expression for the coincidence correction for a voluminous sample:

$$COI_g = \frac{\varepsilon_g \cdot n}{\sum_{i=1}^{n} \frac{\varepsilon_{g,i}}{COI_{g,i}}}$$

where $\varepsilon_g$ is the full peak efficiency for the whole sample, $\varepsilon_{g,i}$ is the efficiency for the ith subsample, and n is the number of subsamples. In the most general case, the summation is replaced with an integration, resulting in the final coincidence correction equation:

$$COI_g = \frac{\varepsilon_g}{\iiint \frac{\varepsilon_{(g)x,y,z}}{COI_{(g)x,y,z}} dxdydz}$$

This invention consists of developing a special methodology to deal with this equation. Values of full peak efficiency inside the sample ($\varepsilon_{(g)\,x,y,z}$) are obtained from results of an efficiency mapping in the space around the detector (V. V. Atrashkevich and V. P. Kolotov. *J. Radioanal. Nucl. Chem., Articles,* 169 (1993), p.397). The value of the efficiency includes consideration of attenuation of radiation in the sample and in the container. The values of $COI_{(g)x,y,z}$ for the points under integration inside the sample are computed in accordance with available formulas (F. De Corte and C. Freitas, *J. Radioanal. Nucl. Chem., Articles,* 160 (1992), p.253) which involve the full peak efficiency, decay chain data, and the peak-to-total ratio. Nuclear data (decay chains data) needed for $COI_{(g)x,y,z}$ computation are preferably organized in the form of a special data base.

The invention makes simultaneous integration of two functions, the coincidence correction factor and the total sample efficiency. The necessity to know the P/T-ratio for the arbitrary point inside the sample is the most critical aspect for the invention. It has been found that P/T-ratio quite weakly depends on the distance between source and detector along the detector axis. The influence of this dependence on the coincidence correction factor is less than 1%. Similar results have also been obtained with test measurements along the side of the detector. An intrinsic P/T-calibration may thus be considered a characteristic of detector practically independent on the position of point source in the working space around detector. For a real voluminous sample, we assume that one can find an "actual" P/T-calibration that is valid for the whole sample. For a detector with 15% of relative efficiency, it has been found that the intrinsic P/T-calibration may be considered as such "actual" calibration. The error introduced by this assumption is less than one percent. For larger detectors, the "actual" P/T calibration may need to be determined separately for each geometry depending on the accuracy requirements.

The method of the present invention is also applicable to cylindrical samples centered on the axis of the detector, including Marinelli beaker geometries.

The detector mapping for the calculations can be produced either experimentally or by using Monte Carlo calculation techniques.

While the method of the present invention has been described, in part, by reference to voluminous radiation sources, it will be understood that the method is applicable, as well, to very small radiation sources.

It will thus be seen that the objects set forth above, among those elucidated in, or made apparent from, the preceding description, are efficiently attained and, since certain changes may be made in the above method without departing from the scope of the invention, it is intended that all matter contained in the above description shall be interpreted as illustrative only and not in a limiting sense.

It is also to be understood that the following claim is intended to cover all of the generic and specific features of the invention herein described and all statements of the scope of the invention which, as a matter of language, might be said to fall therebetween.

What is claimed is:

1. A method of coincidence summing correction for a radiation detector in the presence of a radiation source symmetrical around the axis of said radiation detector, comprising:
   (a) using said radiation detector to provide a measurement of radioactivity of said radiation source, said measurement producing a radiation spectrum containing at least two gamma radiation transition values which interfere with each other to produce summing losses or gains, providing data for efficiency mapping in the space around said detector, and producing a peak-to-total ratio value;
   (b) calculating a coincidence summing correction factor per the equation $$COI_g = \frac{\varepsilon_g}{\int\int\int \frac{\varepsilon_{(g)x,y,z}}{COI_{(g)x,y,z}} dx\,dy\,dz}$$

where $\varepsilon_g$ is full peak efficiency for said radiation source, where $\varepsilon_{(g)\ x,y,z}$ are values of full peak efficiency inside said radiation source obtained from said efficiency mapping in the space around said detector, and where the values of $COI_{(g)x,y,z}$ for points under integration inside said radiation source are a function of full peak efficiency, decay chain data, and said peak-to-total ratio; and
   (c) applying said coincidence summing correction factor to each of said at least two gamma radiation transition values to correct for said summing losses or gains.

* * * * *